(12) United States Patent  
Johnson et al.

(10) Patent No.: US 8,715,119 B1
(45) Date of Patent: May 6, 2014

(54) ADJUSTABLE DRIVE SYSTEM

(75) Inventors: Michael J. Johnson, Spokane, WA (US); Richard A. McQuary, Spokane, WA (US); Jacob M. Culley, Cheney, WA (US); Casey L. McGourin, Spangle, WA (US)

(73) Assignee: R.A. Pearson Company, Spokane, WA (US)

( * ) Notice: Subject to any disclaimer, the term of this patent is extended or adjusted under 35 U.S.C. 154(b) by 1351 days.

(21) Appl. No.: 11/671,912

(22) Filed: Feb. 6, 2007

Related U.S. Application Data

(60) Provisional application No. 60/743,255, filed on Feb. 8, 2006.

(51) Int. Cl.
*F16H 7/00* (2006.01)
*B65G 15/26* (2006.01)

(52) U.S. Cl.
USPC .............................. 474/58; 474/137; 198/588

(58) Field of Classification Search
USPC ...................... 474/58, 137; 198/588, 812, 834
See application file for complete search history.

(56) References Cited

U.S. PATENT DOCUMENTS

| 145,721 | A | * | 12/1873 | Clark | 474/137 |
| 220,007 | A | * | 9/1879 | Warth | 474/58 |
| 245,988 | A | * | 8/1881 | William | 474/58 |
| 561,953 | A | * | 6/1896 | James | 474/58 |
| 861,332 | A | * | 7/1907 | Tenetham | 474/68 |
| 1,010,297 | A | * | 11/1911 | Michener, Jr. | 198/801 |
| 1,073,376 | A | * | 9/1913 | Vivian | 198/861.5 |
| 1,140,319 | A | * | 5/1915 | Van Houten | 474/139 |
| 5,440,852 | A | | 8/1995 | Lam | |
| 6,705,962 | B2 | * | 3/2004 | Schinzel | 474/140 |
| 7,988,575 | B2 | * | 8/2011 | Huang | 474/136 |

* cited by examiner

*Primary Examiner* — David D Le
*Assistant Examiner* — Terry Chau
(74) *Attorney, Agent, or Firm* — Lee & Hayes, PLLC

(57) ABSTRACT

An adjustable chain drive system is adapted for uses such as moving product through a conveyor system, and can be configured using a chain, belt or similar structure. Two driven sprockets are movable on a slide, allowing the distance between them to be adjusted. In one example, such adjustment allows conveyor belts to be separated by a desired distance. A drive sprocket and endless chain is used in the drive system. In one configuration, the endless chain includes an adjustable chain segment separating the first and second driven sprockets. To compensate for movement of the first and/or second driven sprockets and change in length of the adjustable chain segment between them, lengths of first and/or second secondary adjustable chain segments adjacent to the adjustable chain segment are varied.

15 Claims, 4 Drawing Sheets

ADJUSTABLE DRIVE SYSTEM

RELATED APPLICATIONS

This patent application claims priority to U.S. patent application Ser. No. 60/743,255, titled "Case Sealer with Synchronous Drive System", filed on Feb. 8, 2006, commonly assigned herewith, and hereby incorporated by reference.

BACKGROUND

Chain and/or belt drive systems (hereinafter referred to generically as "chain drive systems" or similar, but meaning chain, belt, timing belt or similar alternative drive system) are used for many purposes, such as driving a conveyor system. In some applications, one drive sprocket drives two driven sprockets. In such applications, it may be advantageous to adjust a distance between the two driven sprockets. Such an adjustment changes the course of the drive chain. To accommodate such a change of course, a take-up sprocket may be used. However, positioning and adjusting such a sprocket may result in added parts count and reduced system reliability.

Additional complexity within the chain drive system may result if the system is required to allow adjustment of a distance between the driven sprockets. In one example, the adjustment may include movement of the sprockets at different speeds toward or away from each other. Alternatively, the adjustment may include movement of one driven sprocket toward or away from a stationary driven sprocket.

Accordingly, a need exists for improved chain drive systems.

SUMMARY

An adjustable chain drive is adapted for uses such as moving product through a conveyor system. In one example configuration, the drive provides a drive sprocket and two driven sprockets, wherein the driven sprockets are separated by an adjustable distance. For example, the driven sprockets may be movable on a slide, allowing the distance between them to be adjusted. To continue the example, such adjustment of the distance between driven sprockets allows conveyor belts, each driven by a driven sprocket, to be separated by a desired distance. To refine the example further, an endless chain driven by the drive sprocket includes an adjustable chain segment separating the first and second driven sprockets. To compensate for movement of the first and/or second driven sprockets and change in length of the adjustable chain segment between them, lengths of first and/or second secondary adjustable chain segments adjacent to the adjustable chain segment are varied. In such an example configuration, one or both driven sprockets may be moved, thereby changing the distance between driven sprockets.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 1 illustrates a configuration wherein the two driven sprockets are separated by a narrow distance.

DETAILED DESCRIPTION

Overview

The following discussion is directed to an adjustable chain drive system, including examples of both construction and operation. As noted above, while reference is made to "chain," this term will be broadly construed to mean chain, belt, timing belt or any similar drive system. In the example discussed, two driven sprockets are separated by an adjustable segment of the drive chain allowing the distance between the driven sprockets to be adjusted. Adjustment of the adjustable segment of the drive chain between the driven sprockets is synchronized with two secondary adjustable chain segments adjacent to the adjustable segment. For example, lengthening of the adjustable segment of the drive chain between the driven sprockets could be accompanied by shortening of one or both secondary adjustable chain segments.

Example Construction

Figure 1:
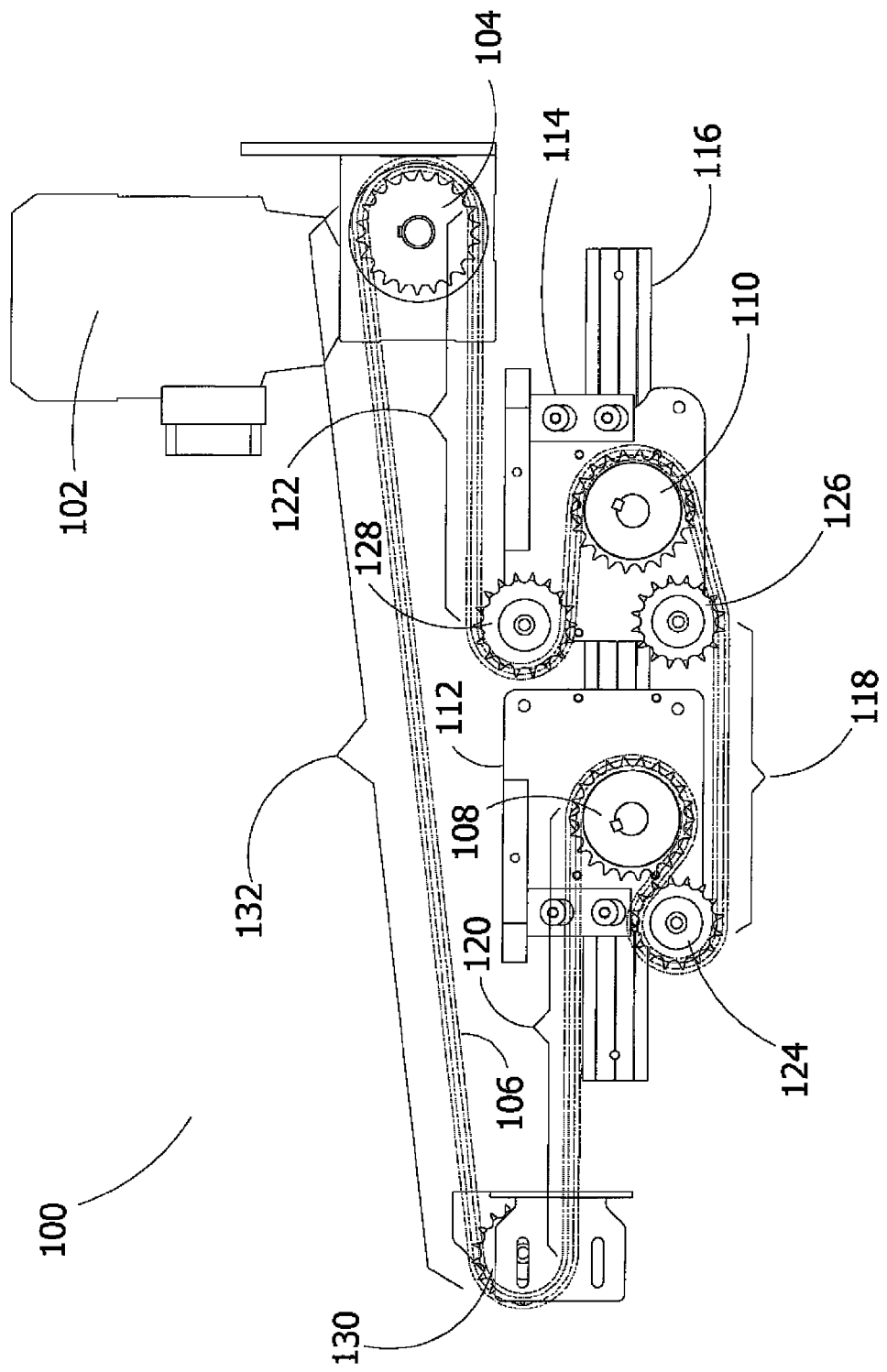
FIG. 1 illustrates an example of a chain drive system with adjustably separable driven sprockets. In particular.

FIG. 1 shows an example adjustable chain drive system 100, wherein a distance between two driven sprockets is adjustable. In this example, a motor 102 and associated drive sprocket 104 drives an endless (i.e. circular) drive chain 106. The drive chain 106 is either a chain, belt (e.g. timing belt) or similar structure. The drive chain 106 drives two driven sprockets 108, 110. In the configuration of FIG. 1, the driven sprockets 108, 110 are driven in opposite directions; however, the driven sprockets could be driven in the same direction by reconfiguring the drive system, such as by addition of an idler sprocket to redirect the drive chain. The driven sprockets 108, 110 are distinguished from idler sprockets in that they each drive a load, which is not shown for illustrative clarity. In one example, the loads driven by the driven sprockets may form a conveyor system configured to include two opposed conveyor belts. The conveyor belts may be separated by a distance determined by product packaging moving through the conveyor system. Thus, in such a system, only the single motor 102 is required to drive the two driven sprockets 108, 110, as opposed to configuring each sprocket 108, 110 as a drive sprocket with a dedicated motor.

The driven sprockets 108, 110 are each supported by a sled 112, 114. The sleds 112, 114 are configured for movement along a slide, rod or rail 116. Thus, the distance between the driven sprockets 108, 110 may be adjusted by moving the sleds 112, 114 along the rail 116. Such adjustment allows the mechanical power delivered by each driven sprocket 108, 110 to be positioned at a required location. Accordingly, the chain drive is adjustable.

Figure 2:
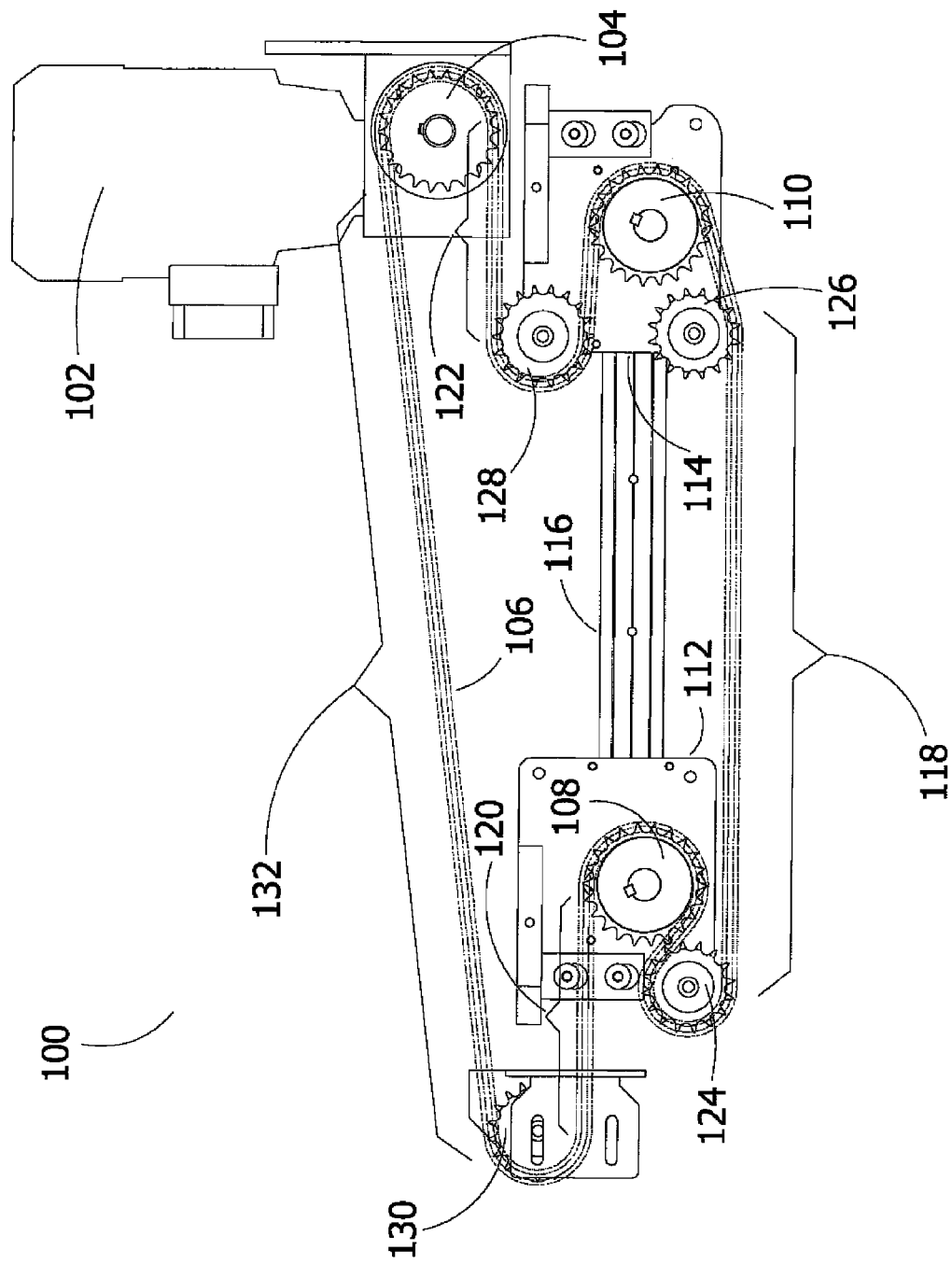
FIG. 2 illustrates a second view of the chain drive system of FIG. 1, wherein the two driven sprockets are separated by a wide distance.

An adjustable chain segment 118 is the portion of the drive chain 106 that separates the driven sprockets 108, 110. When the driven sprockets 108, 110 are moved together, as seen in FIG. 1, the adjustable chain segment 118 is shorter. Conversely, when the driven sprockets are moved further apart, as seen in FIG. 2, the adjustable chain segment is longer. Thus, the adjustable chain segment 118 is that portion of the drive chain 106 generally positioned between the sleds 112, 114, which adjusts in length to reflect adjustment in distance between the driven sprockets.

First and second secondary adjustable chain segments 120, 122 are portions of the drive chain 106 adjacent to (i.e. separated by one or more driven and/or alignment sprockets from) the adjustable chain segment 118. In the example of FIG. 1, the first and second secondary adjustable chain segments 120, 122 are part of the drive chain and oriented parallel to the adjustable chain segment 118. Each of the first and second secondary adjustable chain segments 120, 122 is on an opposite side of the first and second driven sprockets 108, 110, respectively, from the adjustable chain segment 118. The first and second secondary adjustable chain segments 120, 122 are configured to increase or decrease in length in response to movement of the first and second sleds 112, 114. For example, if the left sled 112 is moved away from the right sled 114, the adjustable chain segment 118 will increase in length and the secondary adjustable chain segment 120 will decrease by a related length in response. Similarly, if the right sled 114 is moved toward the left sled 112, the adjustable chain segment 118 will decrease in length and the secondary adjustable chain segment 122 will increase in length in response. Thus, the first and second secondary adjustable chain segments 120, 122 are configured to change in length in response to changes in length of the adjustable chain segment 118. More particularly, each of the first and second secondary chain segments adjusts in length in response to movement of the left and right slides 112, 114 and associated left and right driven sprockets 108, 110, respectively.

The example embodiment 100 of FIG. 1 includes three alignment sprockets 124, 126, 128. The alignment sprockets are located to configure the drive chain 106 so that the adjustable chain segment 118, the secondary adjustable chain segments 122, 124 and the rail 116 are all oriented in parallel directions. Moreover, the alignment sprockets are configured to result in contact by the drive chain 106 to a sufficient portion of the perimeter of the driven sprockets 108, 110. Different configurations, positions and numbers of alignment sprockets could be utilized, consistent with the teachings expressed herein. In the example of FIG. 1, an alignment sprocket 124 is located to position the left end of the adjustable chain segment 118. The alignment sprocket 126 is located to position the right end of the adjustable chain segment 118. Together, alignment sprockets 124, 126 position the adjustable chain segment 118 in a parallel relationship to the rail 116 supporting the movable sleds 112, 114 including the driven sprockets 108, 110.

Additionally, alignment sprocket 128 is located with respect to the drive sprocket 104 to position the left end of the right secondary adjustable chain segment 122 in a parallel relationship with the rail 116. Similarly, the idler sprocket 130 is located with respect to the driven sprocket 108 to position the left end of the left secondary adjustable chain segment 120 in a parallel relationship with the rail 116. Thus, the rail 116, the adjustable chain segment 118 and the left and right secondary adjustable chain segments 120, 122 are maintained in a parallel relationship.

In the example of FIG. 1, the drive sprocket 104 and the idler sprocket 130 are fixed in location. In an alternative example, any sprocket could be a drive sprocket, and other sprockets could be configured as idler sprockets. Accordingly, in an alternative embodiment, the drive sprocket of FIG. 1 could be configured as an idler sprocket, and a different sprocket could be configured as the drive sprocket. However, in the example of FIG. 1, the drive sprocket 104 is selected in part because of its fixed location. In this configuration, the idler sprocket 130 and drive sprocket 104 are separated by a fixed length segment 132 of the drive chain 106. Accordingly, in the example of FIG. 1, the idler sprocket 130 is separated by the fixed length segment 132 from the drive sprocket 104 in a first direction, and by the adjustable chain segment 118 and the first and second secondary adjustable chain segments 120, 122 in the other direction.

FIG. 2 illustrates a second view of the chain drive system of FIG. 1, wherein the two driven sprockets 108, 110 are separated by a wide distance. Thus, a comparison of FIGS. 1 and 2 illustrates that in FIG. 1 the driven sprockets 108, 110 are separated by a relatively narrow distance, while in FIG. 2 the driven sprockets are separated by a relatively wide distance. Thus, FIG. 1 shows that the adjustable chain segment 118 is relatively shorter, while FIG. 2 shows that the adjustable chain segment is relatively longer. Accordingly, FIG. 1 shows that the secondary adjustable chain segments 120, 122 are relatively longer, while FIG. 2 shows that the secondary chain segments are relatively shorter. FIGS. 1 and 2 show the fixed motor 102, drive sprocket 104 and idler sprocket 130 in the same fixed locations.

Figure 3:
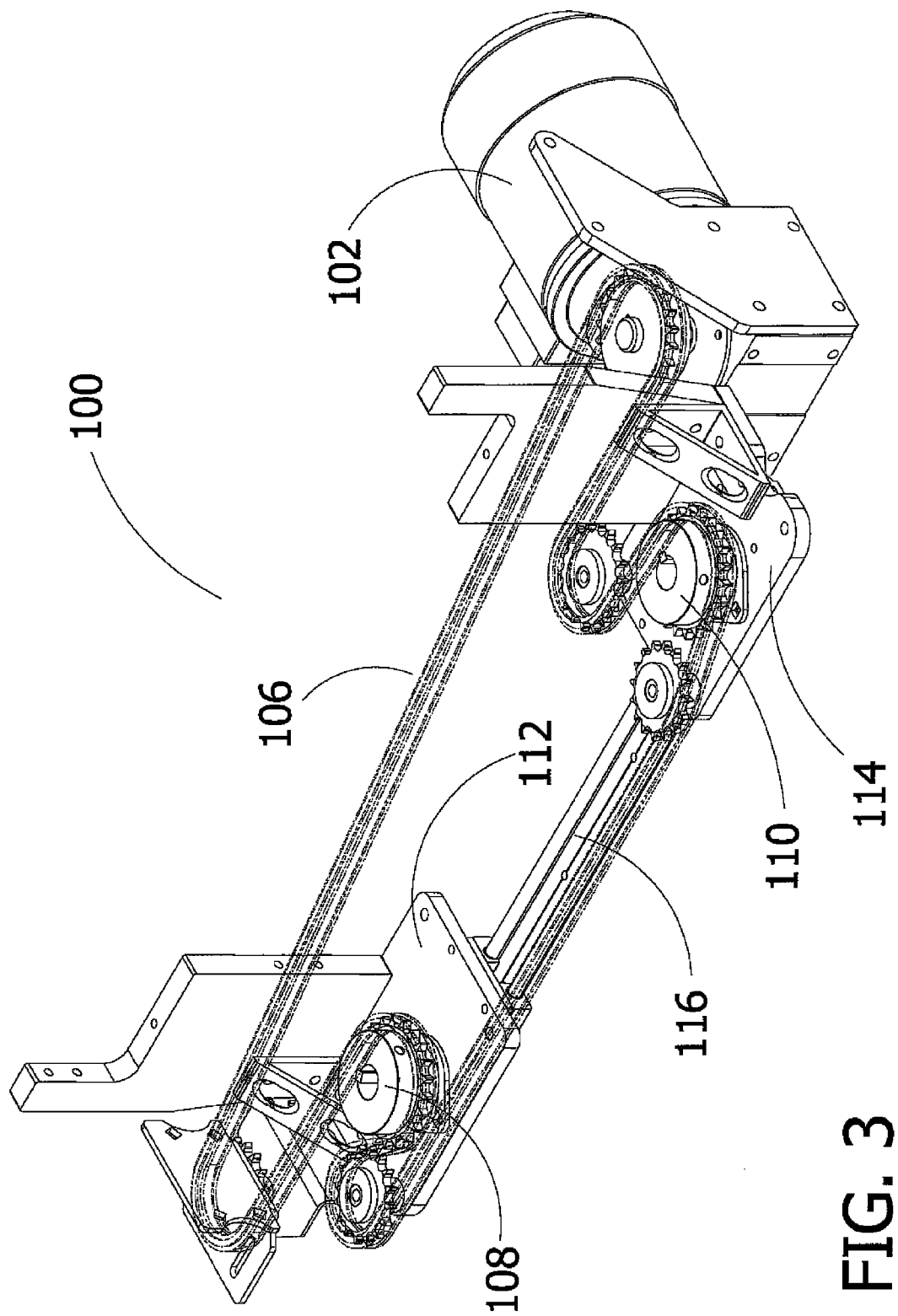
FIG. 3 illustrates a view of the configuration seen in FIG. 2, taken from a different perspective.

FIG. 3 illustrates a view of the example adjustable chain drive 100 seen in FIG. 2, wherein the view is taken from a different perspective. Thus, FIG. 3 shows the sleds 112, 114 located substantially at the end portions of the rail 116, and therefore separated by a relatively wider distance than seen in FIG. 1.

Example Operation

Figure 4:
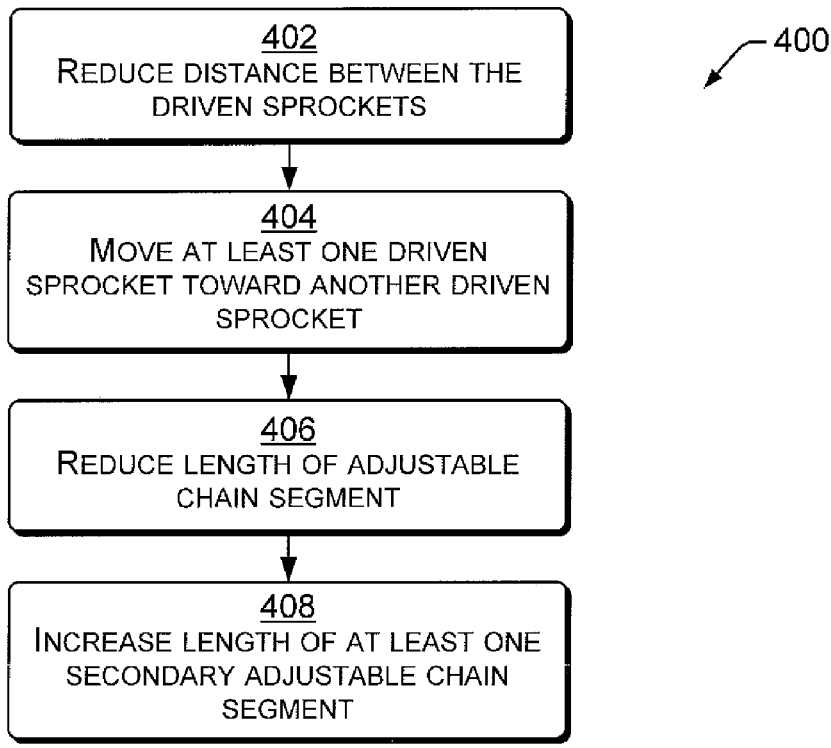
FIG. 4 illustrates an example of events involved in reducing distance between the driven sprockets.

FIG. 4 illustrates an example of events involved in reducing distance between the driven sprockets 108, 110 and associated sleds 112, 114. This can be thought of as movement from the configuration of FIG. 2 to the configuration of FIG. 1. At block 402, a decision is made to reduce distance between the driven sprockets. For purposes of discussion, the driven sprockets are considered to be sprockets that are driven by a drive sprocket and that drive a load, wherein a distance between them is adjustable. This is consistent with FIGS. 1-3, wherein the driven sprockets 108, 110 are adjustable along the slide 116. Also, in many applications, each of the "driven sprockets," while driven by a drive sprocket, in turn drives some apparatus, such as part of a conveyor system. In an alternative embodiment, one of the "driven sprockets" could actually be in direct communication with a drive motor; however, it is typically more convenient to locate the drive motor to drive a stationary sprocket (e.g. drive sprocket 104 in FIG. 1). Thus, at block 402 a decision is made to reduce the distance between the driven sprockets, typically to relocate at least one apparatus driven by at least one of the driven sprockets (i.e. to relocate a load associated with a driven sprocket).

At block 404, at least one of the driven sprockets is moved toward the other driven sprocket, thereby reducing the distance between the driven sprockets. A typical example of such movement is illustrated by FIGS. 1 and 2, wherein the driven sprockets 108, 110, located relatively more distantly as seen in FIG. 2, are moved toward each other, where they are located relatively less distantly as seen in FIG. 1.

Block 406 illustrates that the movement of at least one of the driven sprockets toward the other driven sprocket reduces length of an adjustable chain segment. Again, referring to the typical example illustrated by FIG. 2, it can be seen that either of the driven sprockets 108, 110 may be moved toward the other driven sprocket. In FIG. 2, the adjustable chain segment 118 is relatively long. In the example of FIGS. 1-3 movement of the driven sprockets is made along a slide 116; however, other means of adjustment could be substituted. Referring to FIG. 1, the results of movement of both driven sprockets 108, 110 toward each other can be seen. In FIG. 1, the adjustable chain segment 118 is relatively short. Accordingly, block 406 illustrates that movement of the driven sprockets toward each other can reduce the length of the adjustable chain segment 116 of the drive chain 106. Generally, where a first driven sprocket is moved toward a second driven sprocket by a distance greater than the second is moved away from the first (if this is the case) then the overall result is movement of the driven sprockets toward each other and reduction of the length of the adjustable chain segment 118 portion of the drive chain 106.

Block 408 illustrates that a length of at least one secondary adjustable chain segment is increased, in response to the reduction in the length of the adjustable chain segment. Again, comparison of FIGS. 1 and 2 illustrate aspects recited by block 408. Referring first to FIG. 2, it can be seen that the driven sprockets 108, 110 are separated by a distance greater than that shown by FIG. 1. Moving the driven sprockets 108, 110 together as discussed by block 406 results in reduction of the length of the adjustable chain segment 118 and also an increase in the length of the secondary adjustable chain segments 120, 122. That is, length of at least one of the secondary chain segments 120, 122 will increase in response to movement of the driven sprocket 108 and/or 110 associated with that at least one secondary chain segment toward the other driven sprocket.

Figure 5:
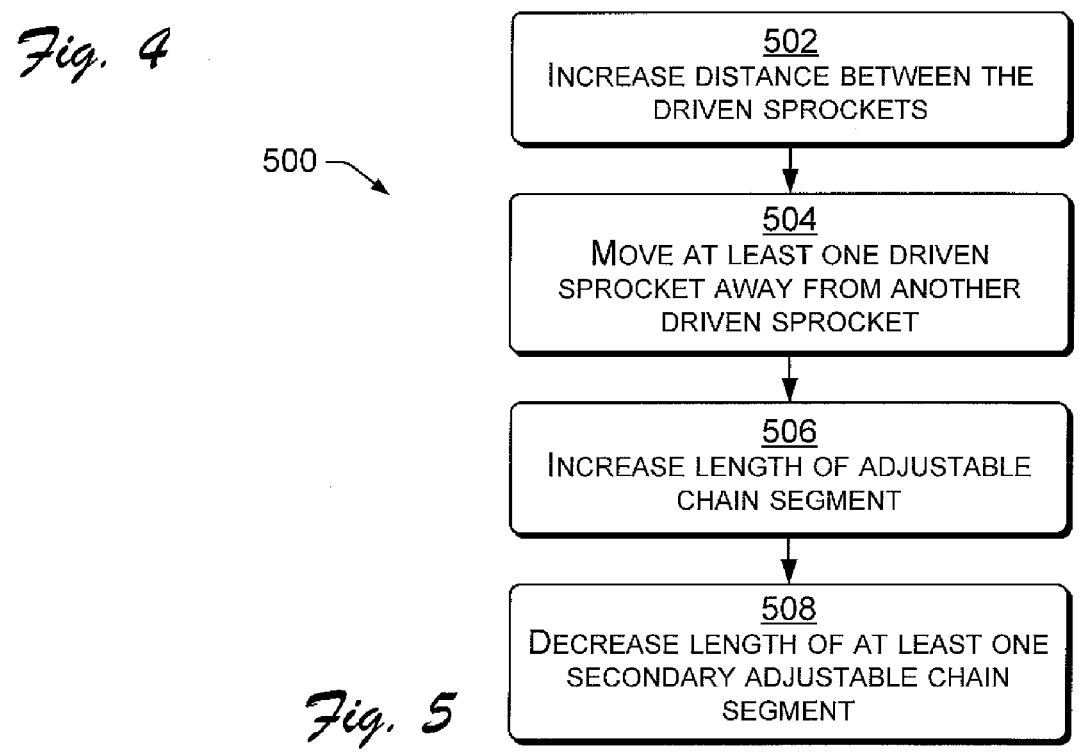
FIG. 5 illustrates an example of events involved in increasing distance between the driven sprockets.

FIG. 5 illustrates an example of events involved in increasing distance between the driven sprockets. This can be thought of as movement from the configuration of FIG. 1 to the configuration of FIG. 2. The discussion of FIG. 4 is hereby incorporated by reference, because the movement discussed in FIG. 5 is easily understood to be the reverse of that discussed by FIG. 4. At block 502, it is determined that the distance between the driven sprockets is to be increased. At block 504, the increase in the distance between the driven sprockets results in movement of at least one driven sprocket away from the other. At block 506, movement of the driven sprockets away from each other results in an increase on the length of the adjustable chain segment (e.g. segment 118 of FIGS. 1 and 2). At block 508, the increase in the length of the adjustable chain segment 118 results in a decrease in the length of the secondary adjustable chain segments 120, 122.

Conclusion

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts. Moreover, the reader is reminded that the term "chain" is used generically, and is intended to mean not only chain, but any type of belt, such as a timing belt, or other material having similar utility.

The invention claimed is:

1. An adjustable chain drive, comprising:
   a drive sprocket;
   first and second driven sprockets, supported by first and second sleds, respectively, the sleds supported by a slide, wherein a distance between the sleds is adjustable, wherein an endless chain driven by the drive sprocket drives the driven sprockets, wherein the driven sprockets are driven in opposite directions, and wherein the endless chain comprises:
      an adjustable chain segment separating the first and second driven sprockets; and
      first and second secondary adjustable chain segments adjacent to the adjustable chain segment;
   at least one alignment sprocket, carried by at least one of the first and second sleds, wherein the at least one alignment sprocket is positioned so that:
      the adjustable chain segment and the first and second secondary adjustable chain segments are parallel without the adjustable chain segment being co-linear to the first and second secondary adjustable chain segments; and
      the adjustable chain segment and the first and second secondary adjustable chain segments are kept parallel if the distance between the sleds is adjusted; and
   an idler sprocket, separated by a fixed length segment from the drive sprocket in a first direction, and by the adjustable chain segment and the first and second secondary adjustable chain segments in the other direction.

2. The chain drive of claim 1, wherein:
   reducing distance between the first and second sleds supporting the first and second driven sprockets shortens the adjustable chain segment and lengthens the first and second secondary adjustable chain segments of the endless chain; and
   increasing the distance between the first and second sleds supporting the first and second driven sprockets lengthens the adjustable chain segment and shortens the first and second secondary adjustable chain segments.

3. The chain drive of claim 1, wherein the adjustable chain segment and the two secondary adjustable chain segments are maintained in a parallel relationship when the first and second sleds are moved along the slide.

4. The chain drive of claim 1, additionally comprising:
   first and second alignment sprockets, supported by first and second sleds, respectively, configured to align the adjustable chain segment and the two secondary adjustable chain segments in parallel directions while the first and second sleds are moved.

5. The chain drive of claim 1, wherein movement along the slide by one driven sprocket, while the other driven sprocket is stationary, results in a change of the adjustable distance between the driven sprockets, and by a change of a length of one secondary adjustable chain segment by the change of the adjustable distance.

6. A drive system with adjustably separable driven sprockets, comprising:
   first and second driven sprockets, supported by first and second sleds, respectively, the sleds supported by a slide, wherein a distance between the sleds can be adjusted, and wherein the first and second driven sprockets are driven in opposite directions;
   a drive chain, configured to drive both driven sprockets;
   an adjustable chain segment, part of the drive chain, wherein the adjustable chain segment is located between the two driven sprockets;
   first and second secondary adjustable chain segments, part of the drive chain, are oriented in parallel to, without being co linear to, the adjustable chain segment, wherein each of the first and second secondary adjustable chain segments is on an opposite side of the first and second driven sprockets, respectively, from the adjustable chain segment, wherein:
      reducing distance between the first and second sleds supporting the first and second driven sprockets shortens the adjustable chain segment and lengthens at least one of the first and second secondary adjustable chain segments of the drive chain; and increasing distance between the first and second sleds supporting the first and second driven sprockets lengthens the adjustable chain segment and shortens at least one of the first and second secondary adjustable chain segments;

at least one alignment sprocket, carried by at least one of the first and second sleds, wherein the at least one alignment sprocket is positioned to keep at least one of the adjustable chain segment and the first and second secondary adjustable chain segments parallel to one other segment of said segments if the distance between the sleds is adjusted; and an idler sprocket, separated by a fixed length segment from a drive sprocket in a first direction, and by the adjustable chain segment and two secondary adjustable chain segments in the other direction.

7. The drive system of claim 6, wherein:

changing a distance between the first and second driven sprockets changes a length of the adjustable chain segment and the first and second secondary adjustable chain segments;

wherein the first and second secondary adjustable chain segments change in length corresponding to distance of movement of the first and second driven sprockets, respectively.

8. The drive system of claim 6, wherein the slide is parallel to the adjustable chain segment and the two secondary adjustable chain segments.

9. The drive system of claim 6, additionally comprising:

at least two alignment sprockets; wherein the idler sprocket, the drive sprocket and the at least two alignment sprockets are configured and positioned to align the adjustable chain segment and the two secondary adjustable chain segments in parallel directions.

10. The drive system of claim 6, wherein movement of one driven sprocket along the slide, while the other driven sprocket is stationary, results in a change of the distance between the driven sprockets, and by a change of a length of one secondary adjustable chain segment by the change of the distance between the driven sprockets.

11. A chain drive system with separately moveable adjustable driven sprockets, comprising:

first and second driven sprockets, supported by first and second sleds, respectively, the sleds supported by a slide, wherein a distance between the sleds is adjustable by movement of at least one sled on the slide, wherein the first and second driven sprockets are driven by a drive chain, and wherein the first and second driven sprockets are driven in opposite directions;

an adjustable chain segment, part of the drive chain, separating the first and second driven sprockets and oriented parallel to the slide, wherein movement of either sprocket shortens or lengthens the adjustable chain segment;

first and second secondary adjustable chain segments, part of the drive chain, oriented parallel to the adjustable chain segment, wherein movement by the first or second driven sprocket results in shortening or lengthening of the adjustable chain segment and a corresponding lengthening or shortening, respectively, of the first or second secondary adjustable chain segment;

at least one alignment sprocket, carried by at least one of the first and second sleds, wherein the at least one alignment sprocket is positioned to maintain a parallel, but not co-linear, relationship between the adjustable chain segment and the first and second secondary adjustable chain segments if the distance between the sleds is adjusted; and an idler sprocket, separated from the drive sprocket by a fixed length segment of the drive chain in a first direction, and separated from the drive sprocket by the adjustable chain segment and two secondary adjustable chain segments in the other direction.

12. The chain drive system of claim 11, additionally comprising:

at least two alignment sprockets; wherein the idler sprocket, the drive sprocket and the at least two alignment sprockets are configured and positioned to align the adjustable chain segment and the two secondary adjustable chain segments in a direction parallel to the slide.

13. The chain drive system of claim 11, wherein:

each of the first and second sleds are independently moveable along the slide to result in a change in length of the first or second secondary adjustable chain segment, respectively, without movement of the other sled; and the first and second sleds are simultaneously moveable along the slide to result in simultaneous change in length of the first and second secondary adjustable chain segments.

14. The drive system of claim 11, wherein:

moving the driven sprockets together shortens the adjustable chain segment and lengthens at least one of the two secondary adjustable chain segments; and moving the driven sprockets apart lengthens the adjustable chain segment and shortens at least one of the two secondary adjustable chain segments.

15. The drive system of claim 11, additionally comprising:

at least two alignment sprockets, located to keep the adjustable chain segment and the first and second secondary adjustable chain segments parallel.

* * * * *